United States Patent

[11] 3,616,064

| [72] | Inventors | Desmond Reginald Long<br>Chamberley, Surrey;<br>Alan Edgar Crawford, Basingstoke, both of England |
|---|---|---|
| [21] | Appl. No. | 724,074 |
| [22] | Filed | Apr. 25, 1968 |
| [45] | Patented | Oct. 26, 1971 |
| [73] | Assignee | Radyne Limited<br>Wokingham, England |
| [32] | Priority | Aug. 4, 1967 |
| [33] | | Great Britain |
| [31] | | 35,873/67 |

[54] MANUFACTURE OF SYNTHETIC TEXTILE YARNS
3 Claims, 3 Drawing Figs.

[52] U.S. Cl. .................................................. 156/433,
156/73, 156/159, 156/309, 156/580
[51] Int. Cl. ................................................... B65h 69/08
[50] Field of Search ........................................... 156/73,
580, 433, 158, 159, 309

[56] References Cited
UNITED STATES PATENTS

| 2,105,847 | 1/1938 | Stake et al. ................. | 156/491 |
| 2,514,197 | 7/1950 | Groten et al. ................ | 156/158 |
| 3,184,353 | 5/1965 | Balamuth et al. ............. | 156/73 |
| 3,184,363 | 5/1965 | Strother ..................... | 156/433 |

Primary Examiner—Benjamin A. Borchelt
Assistant Examiner—Daniel Bent
Attorney—Kemon, Palmer & Estabrook ABSTRACT: Apparatus for ultrasonically welding together two threadlines under a controlled pressure. The two ends of the threadlines are overlapped in a groove formed along an anvil and a resiliently biased plunger compresses the two ends into the groove. Vibrations transmitted through the anvil weld the two ends together. Pressure is controlled by tensioning springs which stiffen when the vibrations are applied and hence provide the equivalent of a heavy backing mass.

MANUFACTURE OF SYNTHETIC TEXTILE YARNS

In copending U.S. application Ser. No. 724,133, now abandoned, filed Apr. 25, 1968, a method of producing a single continuous threadline from two multifilament threadlines is disclosed, in which ultrasonic vibrations are passed through a rigid support member having a groove for locating overlapped ends of the threadlines. The groove is preferably formed in the stub portion of an ultrasonic transducer and the ends are compressed together during a weld by a resiliently mounted plunger.

To provide a consistent joint of the same quality, the pressure which is applied to the overlapped ends should preferably be closely controlled and maintained constant. It is a primary object of the present invention to provide thread-welding apparatus utilizing the principles disclosed in the aforesaid copending application which enables a precise degree of control to be obtained over the pressure applied to the overlapped ends of the threadlines during a weld, and which, further, is easily adjustable and provides a firm constant pressure without the need for heavy backing devices for the plunger.

According to the present invention a backing member for the plunger is mounted to extend from a frame supporting the plunger and the transducer such that it resists the bias of the plunger away from the groove and tensioning springs extend between the frame and the backing member for resiliently holding the backing member under tension. Thus, when the transducer is energized to ultrasonically weld together the said overlapped ends, the vibrations are transmitted to the tensioning springs which consequently stiffen and prevent any movement of the plunger during a weld. This is equivalent to backing the plunger with a large mass during the welding operation. The pressure exerted by the plunger can easily be preset by adjusting the tension of the tensioning springs.

Preferably, a compression spring holds the head of the plunger against a cam surface and as the cam is rotated the spring is compressed by the head of the plunger until the working end has moved a sufficient distance into the groove in the stub of the transducer to compress the two ends into the groove. The cam may be mounted about an axis through the backing member and the tensioning springs are then conveniently attached to the pivot about which the cam rotates.

One example of the invention will now be described with reference to the accompanying drawings; in which.

Figures 1, 2:
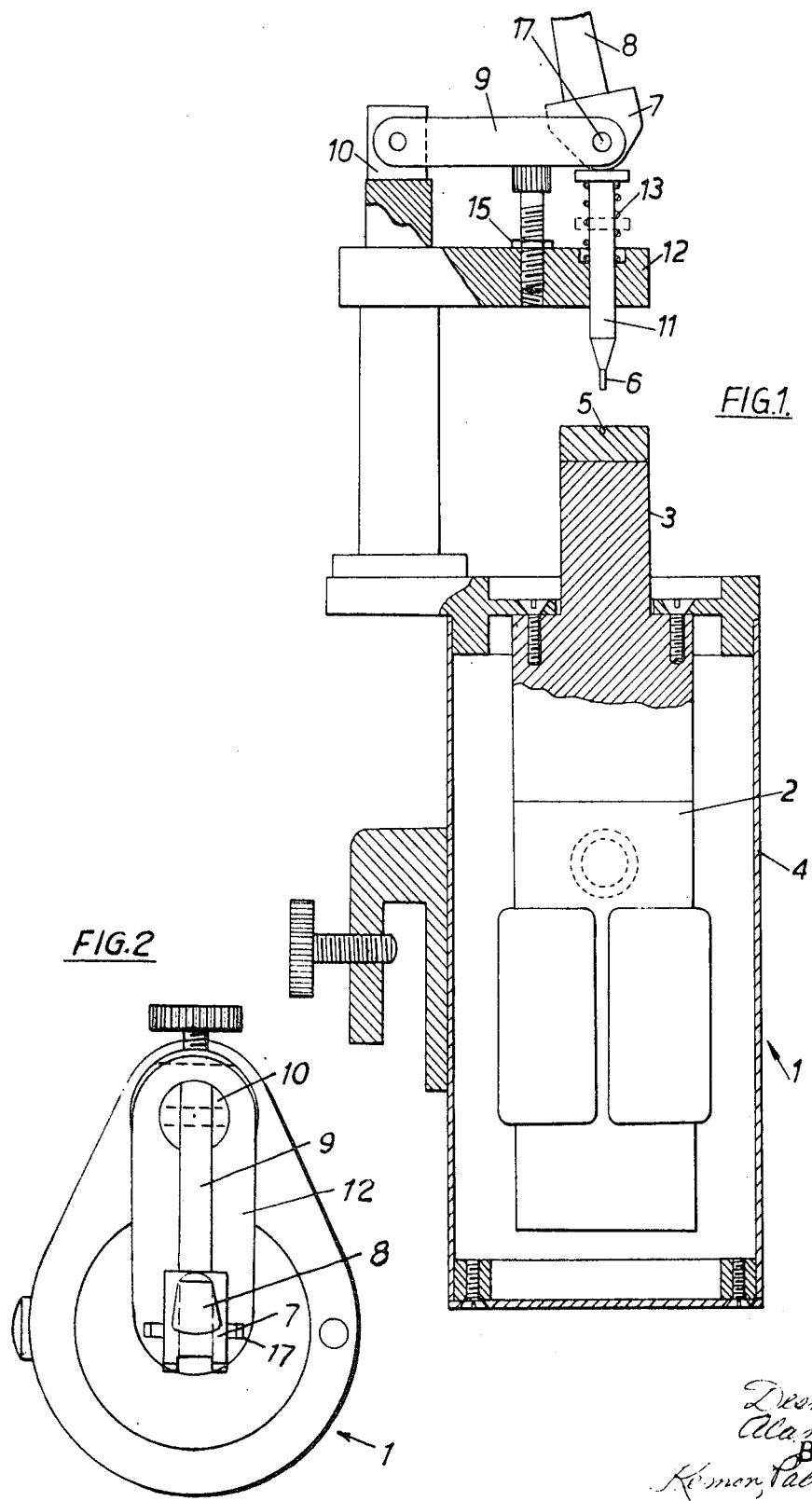
FIG. 1 is a sectional view in elevation through ultrasonic apparatus for jointing the ends of two threadlines.
FIG. 2 is a plan view of FIG. 1.

Referring to these figures, an ultrasonic transducer 1 consists of a magnetostriction or piezoelectric element 2 secured to a half wavelength coupling stub 3. The stub is stepped at its nodal plane and is rigidly mounted by securing the element to a tubular casing 4 through bolts at the step.

The nodal point is a position of no movement in a resonantly vibrating system and rigid mountings may be attached at this point without damping the vibrations.

The casing 4 surrounds the transducer stack, leaving the end of the coupling stub 3 projecting. A straight groove 5 is cut across the face of the stub to locate and support the threadlines being joined, the bottom of the groove being semicircular. A parallel sided plunger 11 with a corresponding semicircular groove across the face of its blade shaped working end 6 is slidably mounted for movement into and out of the stub groove.

Figure 3:
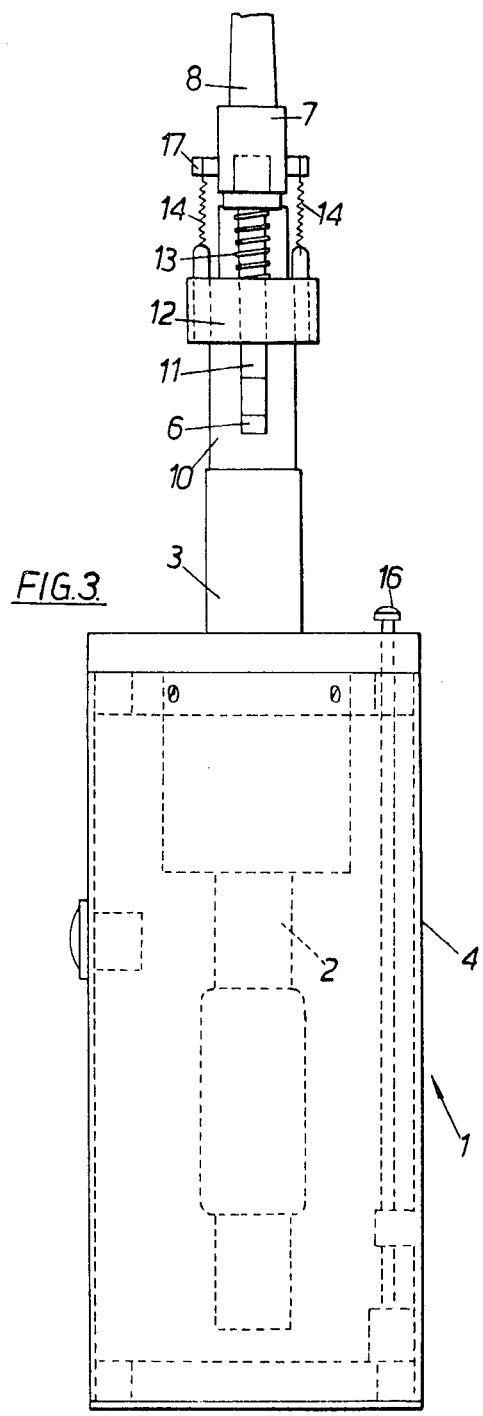
FIG. 3 is an end elevational view of FIG. 1.

The plunger is raised and lowered by means of the cam 7 and lever 8. The cam rotates about a pivot 17 at one end of the arm 9 which serves as a backing member and which is itself pivoted about an axis through the support member 10. The plunger is slidably mounted in the arm 12 and bears against the surface of the cam through the action of the compression spring 13. The compression spring force is opposed by that of the tensioning springs 14 (FIG. 3) attached to the pivot 17. An adjustable stop 15 prevents the arm being moved beyond a predetermined position such that clockwise rotation of the cam from the position shown in FIG. 1 compresses the spring 13 and drives the blade of the plunger a predetermined distance into the groove 5. The pressure exerted by the plunger is determined by the tensioning of the springs, and the position of the adjustable stop prevents the blade bottoming in the groove 5 and determines whether, for example, a circular or an oval-shaped cross section is produced at the joint by controlling the depth of penetration of the blade into the groove.

In operation, the plunger is raised and two yarn ends are overlapped in the stub groove, the loose ends being taken at right angles to the ends of the groove and held under catch plates. The plunger is then lowered, and the blade traps the between the semicircular recesses. The yarns being joined may be composed of purely synthetic filaments, a mixture of natural fibers and synthetic material or wholly of natural fibers. In the latter case a separate synthetic filament is placed in the groove before the plunger is lowered. Electrical power from a generator energizes the transducer through a press button switch 16 and ultrasonic energy is dissipated from the end of the stub. As the synthetic material melts and flows, the blade and groove form the overlapped ends into a circular cross section and consolidate the two ends into a joint. Sharp edges on the blade sever the surplus ends during the heating process and the weld is completed after a preset time. The plunger is then raised to release the yarn.

We claim:

1. Splicing apparatus for forming a single continuous threadline from two multifilament threadlines and from a further threadline of synthetic thermoplastic material if neither of the said two threadlines contains synthetic thermoplastic material comprising:
    a. an ultrasonic transducer including a protruding stub portion;
    b. a groove formed in the said stub portion to locate and laterally confine overlapped ends of the said threadlines;
    c. a plunger mounted for movement toward and away from the said groove;
    d. a frame member for supporting the said transducer and the said plunger;
    e. resilient means biasing said plunger away from said groove;
    f. means for forcing the plunger against said resilient means to move the working end of said plunger a predetermined distance into said groove to compress the said overlapped ends;
    g. a lightweight backing member at the opposite end of said plunger for absorbing the ultrasonic vibrations transmitted through said plunger when said working end compresses the overlapped ends and said ultrasonic transducer is energized, said backing member being mounted on said frame for movement toward and away from said groove to enable said member to follow the movement of said plunger; and
    h. tensioning springs connected to and extending between said backing member and a portion of said frame to hold said backing member in position against said opposite end of said plunger against the bias of said resilient means during movement of said plunger, said tensioning spring being stiffened during a splice due to the ultrasonic vibrations being transmitted therethrough such that the lightweight backing member and said springs provide an effectively rigid backing mass capable of absorbing the vibrations and thereby ensuring substantially constant pressure on the threadlines at the joint area.

2. Apparatus according to claim 1, in which said backing member comprises a movable arm pivotally mounted on the said frame member, and the apparatus further includes a cam mounted for rotation about an axis through the said arm, a compression spring resiliently biasing the head of the plunger against the said cam and means for rotating said cam about the said axis to press said plunger against the said compression spring.

3. Apparatus according to claim 1, including an adjustable stop to prevent said plunger from bottoming in the said groove and to vary the shape of the cross section obtained at the joint.

* * * * *